(12) United States Patent
Takaishi (10) Patent No.: US 8,994,998 B2
(45) Date of Patent: Mar. 31, 2015

(54) IMAGE PROCESSING SYSTEM, IMAGE PROCESSING METHOD, AND IMAGE PROCESSING APPARATUS

(71) Applicant: KYOCERA Document Solutions Inc., Osaka (JP)

(72) Inventor: Hiroyuki Takaishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/037,168

(22) Filed: Sep. 25, 2013

(65) Prior Publication Data

US 2014/0085672 A1   Mar. 27, 2014

(30) Foreign Application Priority Data

Sep. 26, 2012   (JP) .................................. 2012-212278

(51) Int. Cl.
*G06F 3/12* (2006.01)
*H04N 1/00* (2006.01)
*H04N 1/32* (2006.01)
(Continued)

(52) U.S. Cl.
CPC .......... *G06F 3/1236* (2013.01); *H04N 1/00217* (2013.01); *H04N 1/00307* (2013.01); *H04N 1/32117* (2013.01); *H04N 1/32765* (2013.01); *H04N 1/32789* (2013.01); *H04N 2201/0055* (2013.01); *H04N 2201/0094* (2013.01); *H04N 2201/3278* (2013.01); *H04N 2201/3274* (2013.01); *H04N 2201/3205* (2013.01); *H04L 67/1021* (2013.01); *H04L 67/12* (2013.01)
USPC ............................ 358/1.15; 358/1.1; 358/1.13

(58) Field of Classification Search
None
See application file for complete search history.

(56) References Cited

U.S. PATENT DOCUMENTS

| | | | | |
|---|---|---|---|---|
| 5,838,926 | A * | 11/1998 | Yamagishi | 709/249 |
| 6,980,319 | B2 * | 12/2005 | Ohta | 358/1.18 |
| 7,414,747 | B2 * | 8/2008 | Ohta | 358/1.15 |

(Continued)

FOREIGN PATENT DOCUMENTS

| | | |
|---|---|---|
| JP | 09-244830 A | 9/1997 |
| JP | 2006-012091 A | 1/2006 |

(Continued)

OTHER PUBLICATIONS

The extended European search report issued on Apr. 7, 2014 by European Patent Office in the corresponding European patent application No. 13186092.6—8 pages.

(Continued)

*Primary Examiner* — Satwant Singh
(74) *Attorney, Agent, or Firm* — Knobbe, Martens, Olson & Bear LLP (57) ABSTRACT

An image processing system includes an access point, an image processing apparatus, and a communication system. In the image processing apparatus, an apparatus side access point information holding section holds access point information of an access point acquired from the access point. In the communication terminal, a terminal side access point information holding section holds access point information of an access point acquired from the access point. A search section searches for the image processing apparatus having the same access point information as the access point information based on the access point information held in the terminal side access point information holding section. The instruction section transmits a processing instruction to the image processing apparatus detected by the search section.

7 Claims, 10 Drawing Sheets

(51) Int. Cl.
*H04N 1/327* (2006.01)
*H04L 29/08* (2006.01)

(56) References Cited

U.S. PATENT DOCUMENTS

| | | | |
|---|---|---|---|
| 7,522,929 B2 | 4/2009 | Hashizume | |
| 8,094,337 B2 * | 1/2012 | Hashimoto et al. | 358/1.15 |
| 2006/0126585 A1 * | 6/2006 | Kim | 370/338 |
| 2010/0225967 A1 * | 9/2010 | Shiohara et al. | 358/1.15 |
| 2010/0287288 A1 | 11/2010 | Driscoll et al. | |
| 2011/0002009 A1 | 1/2011 | Ohashi | |
| 2012/0077515 A1 | 3/2012 | Oishi | |
| 2013/0163048 A1 * | 6/2013 | Kida et al. | 358/1.15 |
| 2014/0092425 A1 * | 4/2014 | Park | 358/1.15 |

FOREIGN PATENT DOCUMENTS

| | | |
|---|---|---|
| JP | 2006-101293 A | 4/2006 |
| JP | 2007-043303 A | 2/2007 |
| JP | 2007-157077 A | 6/2007 |
| JP | 2009-245027 A | 10/2009 |
| JP | 2012-175341 A | 9/2012 |

OTHER PUBLICATIONS

Notice of Rejection mailed by Japan Patent Office on Aug. 27, 2014 in the corresponding Japanese patent application No. 2012-212278.

* cited by examiner

IMAGE PROCESSING SYSTEM, IMAGE PROCESSING METHOD, AND IMAGE PROCESSING APPARATUS

INCORPORATION BY REFERENCE

This application claims priority to Japanese Patent Application No. 2012-212278 filed on 26, Sep. 2012, the entire contents of which are incorporated by reference herein.

BACKGROUND

The present disclosure relates to an image processing system, an image processing method, and an image processing apparatus.

Recently, image processing apparatuses such as a printer, a copier, and a multifunction peripheral have become a necessity in offices, and the like. Such image processing apparatuses are configured to print image data input from an information processing terminal such as a personal computer through a network such as a local area network (LAN) on paper, or transmit acquired image data to the information processing terminal, in addition to carrying out the acquisition and printing of the image data by a direct operation of a user. Further, a plurality of image processing apparatuses may be often installed on such a network and a user may select a desired image processing apparatus to carry out the printing of the image data, and the like.

When the plurality of image processing apparatuses are present on the network, a user who is unable to figure out a name of the image processing apparatus on the network and an installation position of the real image processing apparatus may not transmit the image data or receive the image data from the image processing apparatus, for example, even when the image processing apparatus is present in front of the user's eyes. Further, when the image processing apparatus is approximately selected, printed matter may be output to an unexpected place, such that the printed matter may not be withdrawn. Further, recently, wireless networks such as a wireless LAN have been proliferated. In such a wireless network, the installation position of the image processing apparatus and the information processing terminal may be easily changed. Therefore, it is more difficult to recognize the installation position of the image processing apparatus from the name of the image processing apparatus which is displayed on the information processing terminal.

For this reason, under the condition that the plurality of image processing apparatuses are installed on the network, various technologies enabling a user to easily output the printed matter from the image processing apparatus in the vicinity of the user using the wireless network and the like have been proposed.

For example, a technique of allowing the image processing apparatus carrying out the output of the image data and the acquisition of the image data and a computer wanting to print the image data and receive the image data to detect an intensity of a zone signal transmitted from each of the plurality of wireless base stations to recognize a control zone (a corresponding zone) of a wireless base station to which the image processing apparatus and the computer belong and a control zone (a neighboring zone) of a neighboring wireless base station has been proposed. In this configuration, the corresponding zone and the neighboring zone recognized by the computer and the image processing apparatus are registered in a server as zone data. For example, when the computer carries out the printing, the computer acquires the zone data from the server and selects the image processing apparatus belonging to the same zone as the zone of the computer based on the corresponding zone data to select the image processing apparatus which is present in the vicinity of the computer.

Further, a technique of including a positioning server calculating a position of the mobile station as a position of the computer based on received results of a radio wave for position detection which is transmitted from a mobile station moving along with the computer or one of the plurality of base stations fixedly installed in known positions and received by another one thereof has been proposed. In this configuration, the position information of the plurality of printers is stored in the positioning server as a database and a distance between the position of the computer and the printer is calculated. Further, the printer having the shortest calculated distance carries out the printing.

SUMMARY

As an aspect of the present disclosure, a technique of further improving the above-described related art is proposed.

An image processing system according to an aspect of the present disclosure includes an access point, an image processing apparatus, and a communication system.

The access point is configured to establish communication with a wireless station through a wireless line.

The image processing apparatus is connected to the access point through the wireless line.

The communication terminal is connected to the access point through the wireless line.

The image processing apparatus includes an apparatus side wireless network interface, an apparatus side access point information holding section, and an image processing section.

The apparatus side wireless network interface is configured to transmit and receive data to and from the access point.

The apparatus side access point information holding section is configured to hold access point information which is acquired from the access point through the apparatus side wireless network interface and uniquely specifies the access point.

The image processing section is configured to process image data.

The communication terminal includes a terminal side wireless network interface, a terminal side access point information holding section, a search section, and an instruction section.

The terminal side wireless network interface is configured to transmit and receive data to and from the access point.

The terminal side access point information holding section is configured to hold access point information which is acquired from the access point through the terminal side wireless network interface and uniquely specifies the access point.

The search section is configured to search the image processing apparatus having the same access point information as the access point information through the terminal side wireless network interface based on the access point information held in the terminal side access point information holding section.

The instruction section is configured to transmit a processing instruction to the image processing apparatus detected by the search section through the terminal side wireless network interface.

An image processing method according to an aspect of the present disclosure is executed by an image processing system including the access point, the image processing apparatus, and the communication terminal.

The image processing method includes;

acquiring access point information by allowing the image processing apparatus to uniquely specify the access point through an apparatus side wireless network interface which transmits and receives data to and from the access point;

acquiring access point information by allowing the communication terminal to uniquely specify the access point through a terminal side wireless network interface which transmits and receives data to and from the access point;

searching, by the communication terminal, for the image processing apparatus having the same access point information as the access point information acquired from the access point through the terminal side wireless network interface;

transmitting, by the communication terminal, a processing instruction to the image processing apparatus having the detected same access point information through the terminal side wireless network interface; and processing, by the image processing apparatus, image data depending on the received processing instruction.

An image processing apparatus according to an aspect of the present disclosure is to be used in an image processing system including the access point, the image processing apparatus, and the communication terminal.

The image processing apparatus includes the apparatus side wireless network interface, the apparatus side access point information holding section, and the image processing section;

wherein when n access point information uniquely specifying the access point acquired by the communication terminal from the access point through a terminal side wireless network interface which transmits and receives the data to and from the access point is the same as access point information held in the apparatus side access point information holding section, a processing instruction transmitted from the communication terminal through the terminal side wireless network interface is received through the access point and the apparatus side wireless network interface and processing depending on the processing instruction is carried out by the image processing section.

DETAILED DESCRIPTION

Hereinafter, embodiments of the present disclosure will be described in detail with reference to the accompanying drawings. Hereinafter, the present disclosure will be described in detail with reference to an image processing system including a digital multifunction peripheral and a portable personal computer (hereinafter referred to as a portable PC) as components.

Figure 1:
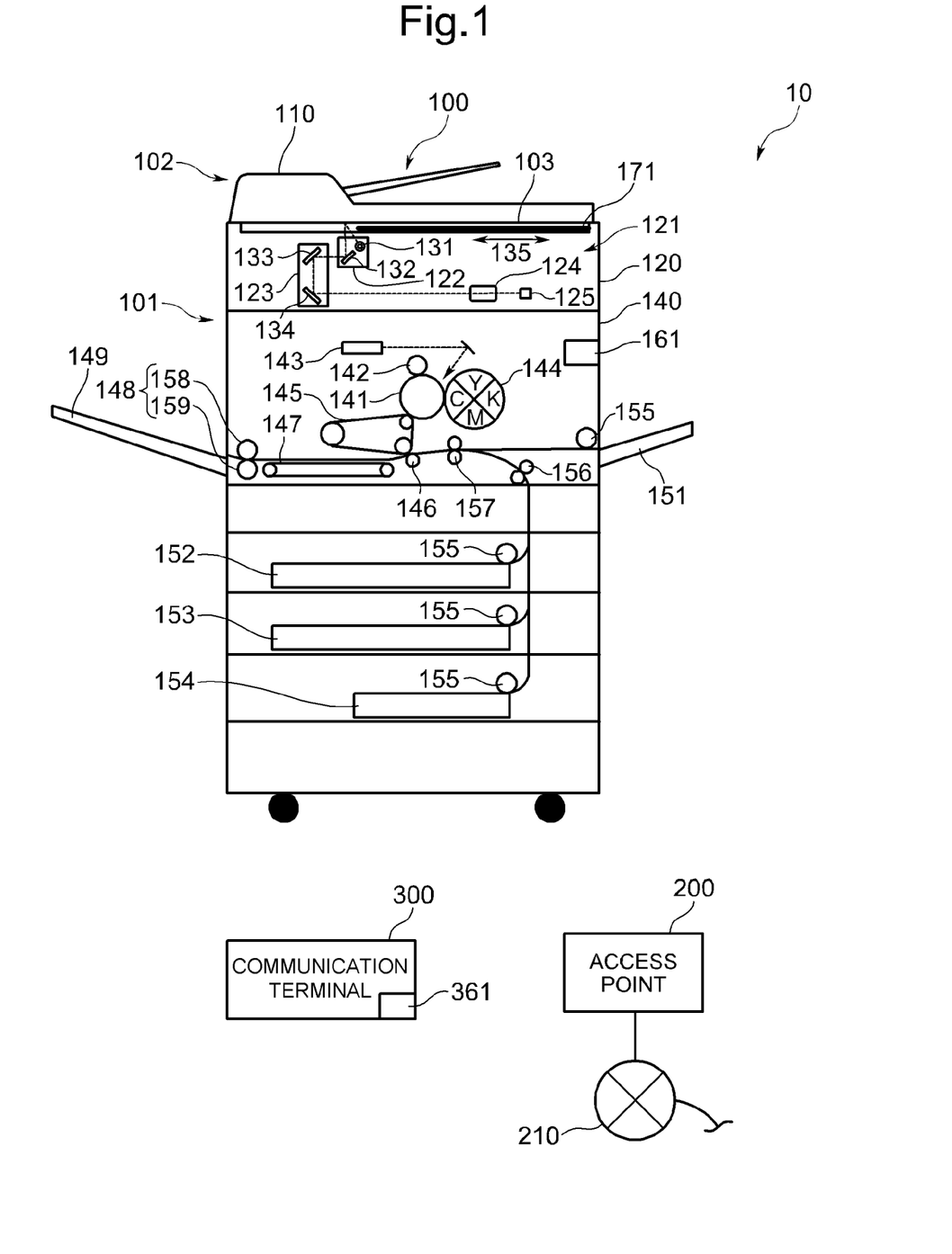
FIG. 1 is a schematic configuration diagram illustrating an overall configuration of an image processing system according to an embodiment of the present disclosure.

FIG. 1 is a schematic configuration diagram illustrating an overall configuration of an image processing system according to an embodiment of the present disclosure. As illustrated in FIG. 1, an image processing system 10 according to the present embodiment includes a multifunction peripheral 100, an access point 200, and a communication terminal 300 including a portable PC.

The multifunction peripheral 100 is one example of the image forming apparatus. The multifunction peripheral 100 includes a body 101 which includes an image scanning section 120 and an image forming section 140 and a platen cover 102 which is mounted on the body 101. A document table 103 is mounted on a top surface of the body 101 and is configured to be opened and closed by the platen cover 102. In addition, the platen cover 102 includes a document conveyance apparatus 110. Further, an operation panel 171 capable of enabling a user to issue an instruction to the multifunction peripheral 100 to start a copy and to issue other instructions or confirming a state and a setting of the multifunction peripheral 100 is mounted on a front surface of the multifunction peripheral 100.

An image scanning section 120 is disposed under the document table 103. The image scanning section 120 scans an image of a document by using a scanning optical system 121 to generate digital data (image data) of the image. The document may be put on the document table 103 and the document conveyance apparatus 110. The scanning optical system 121 includes a first carriage 122, a second carriage 123, and a condensing lens 124. A linear light source 131 and a mirror 132 are mounted in the first carriage 122 and mirrors 133 and 134 are mounted in the second carriage 123. A light source 131 illuminates the document. The mirrors 132, 133, and 134 guide light reflected from the document to the condensing lens 124 and the condensing lens 124 images its own light image on a light receiving surface of a line image sensor 125. In the scanning optical system 121, the first carriage 122 and the second carriage 123 are reciprocally disposed in a sub-scanning direction 135. The image of a document put on the document table 103 can be scanned by an image sensor 125 by moving the first carriage 122 and the second carriage 123 in the sub-scanning direction 135. When the image of the document set in the document conveyance apparatus 110 is scanned, the image scanning section 120 temporarily fixes the first carriage 122 and the second carriage 123 so as to match an image scanning position and scans the image of the document passing through the image scanning position using the image sensor 125. The image sensor 125 generates image data of the document corresponding to each color, such as red (R), green (G), and blue (B), from the light shape incident on the light receiving surface. The generated image data can be printed on paper by the image forming section 140.

The image forming section 140 prints the image data obtained from the image scanning section 120 and the image data received from the external apparatus through the access point 200 and a wireless network interface 161 on paper. The external apparatus includes an external apparatus which is connected to a wired network 210 to which the access point 200 is connected and an external apparatus which is connected to the access point 200 through the wireless network interface 361 (for example, a communication terminal 300).

The image forming section 140 includes a photoconductor drum 141. The photoconductor drum 141 rotates in one direction at a constant speed. A charging device 142, an exposing device 143, a developing device 144, and an intermediate transfer belt 145 are disposed around the photoconductor drum 141 in order from an upstream side of the rotating direction. The charging device 142 uniformly charges a surface of the photoconductor drum 141. The exposing device 143 irradiates light on the surface of the uniformly charged photoconductor drum 141 depending on the image data to form an electrostatic latent image on the photoconductor drum 141. The developing device 144 attaches toner to the electrostatic latent image to form a toner image on the photoconductor drum 141. The intermediate transfer belt 145 transfers the toner image on the photoconductor drum 141 to paper. When the image data is a color image, the intermediate transfer belt 145 transfers the toner image of each color to the same paper. Further, the color image of an RGB type is converted into image data of cyan (C), magenta (M), yellow (Y), black (K) types and the image data of each color is input to the exposing device 143.

The image forming section 140 feeds paper to the transfer section between the intermediate transfer belt 145 and a transfer roller 146 from a manual feed tray 151 or paper feeding cassettes 152, 153, and 154, and the like. Paper having various sizes may be put on or received in the manual feed tray 151 and each of the paper feeding cassettes 152, 153, and 154. The image forming section 140 selects paper depending on paper designated by a user and a size of a document automatically detected and feeds the selected paper to the manual feed tray 151 or the cassettes 152, 153, and 154 by a feeding roller 155. The fed paper is conveyed to the transfer section by a pair of conveyance rollers 156 and a pair of register rollers 157. The paper to which the toner image is transferred is conveyed to a fixing device 148 by a conveyance belt 147. The fixing device 148 includes a fixing roller 158 and a pressing roller 159 in which a heater is embedded and fixes the toner image on the paper by heat and pressing force. The image forming section 140 delivers the paper passing through the fixing device 148 to a paper delivery tray 149.

Figure 2:
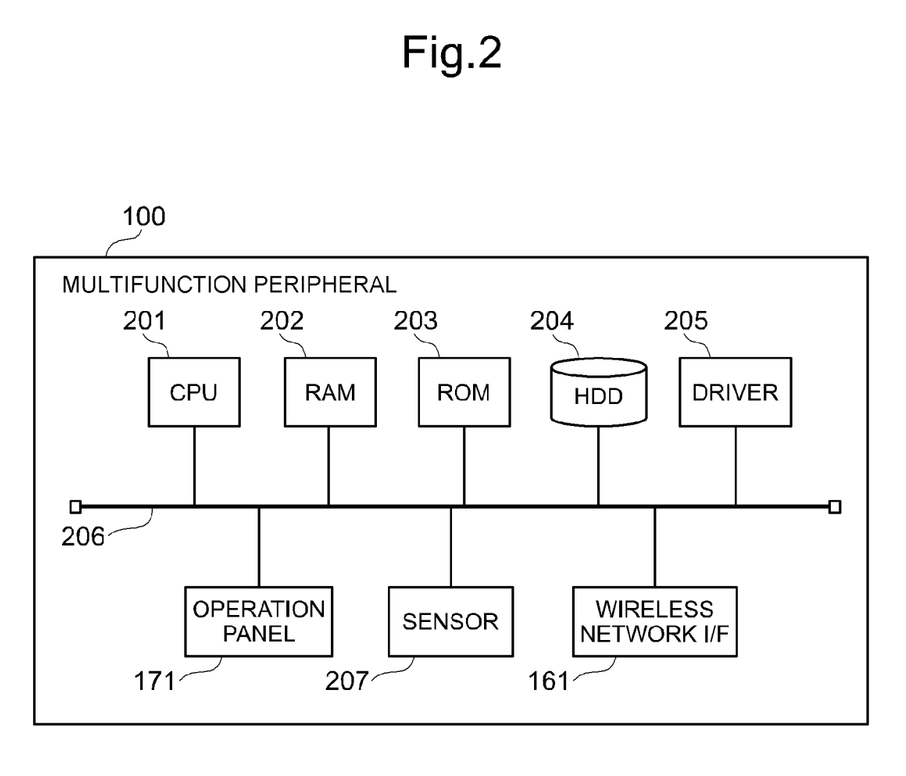
FIG. 2 is a diagram illustrating a hardware configuration of a multifunction peripheral according to the embodiment of the present disclosure.

FIG. 2 illustrates a hardware configuration diagram of a control system in the multifunction peripheral. The multifunction peripheral 100 of the present embodiment includes a central processing unit (CPU) 201, a random access memory (RAM) 202, a read only memory (ROM) 203, a hard disk drive (HDD) 204, and drivers 205 corresponding to each driving section in the document conveyance apparatus 110, the image scanning section 120, and image forming section 140, all of which are connected to each other through an internal bus 206. The ROM 203, the HDD 204, and the like store programs, and the CPU 201 controls the multifunction peripheral 100 depending on instructions of the control programs. For example, the CPU 201 uses the RAM 202 as an operation region to transmit and receive data and instructions to and from the driver 205, thereby controlling the operations of each of the driving sections. Further, the HDD 204 is used to store the image data obtained by the image scanning section 120 and the image data received from external devices through the wireless network interface 161.

An operation panel 171 and various types of sensors 207 are also connected to the internal bus 206. The operation panel 171 receives the operation of the user and supplies a signal to the CPU 201 based on the operation. Further, the operation panel 171 displays an operation screen on a display provided in the operation panel 171, depending on a control signal from the CPU 201. The sensor 207 includes various types of sensors such as an opening and closing detection sensor of the platen cover 102, a document detection sensor on the document 103, a temperature sensor of the fixing device 148, and a detection sensor of the conveyed paper or document. The CPU 201 executes, for example, programs stored in the ROM 203 to realize each device (a functional block) to be described below.

Figure 3:
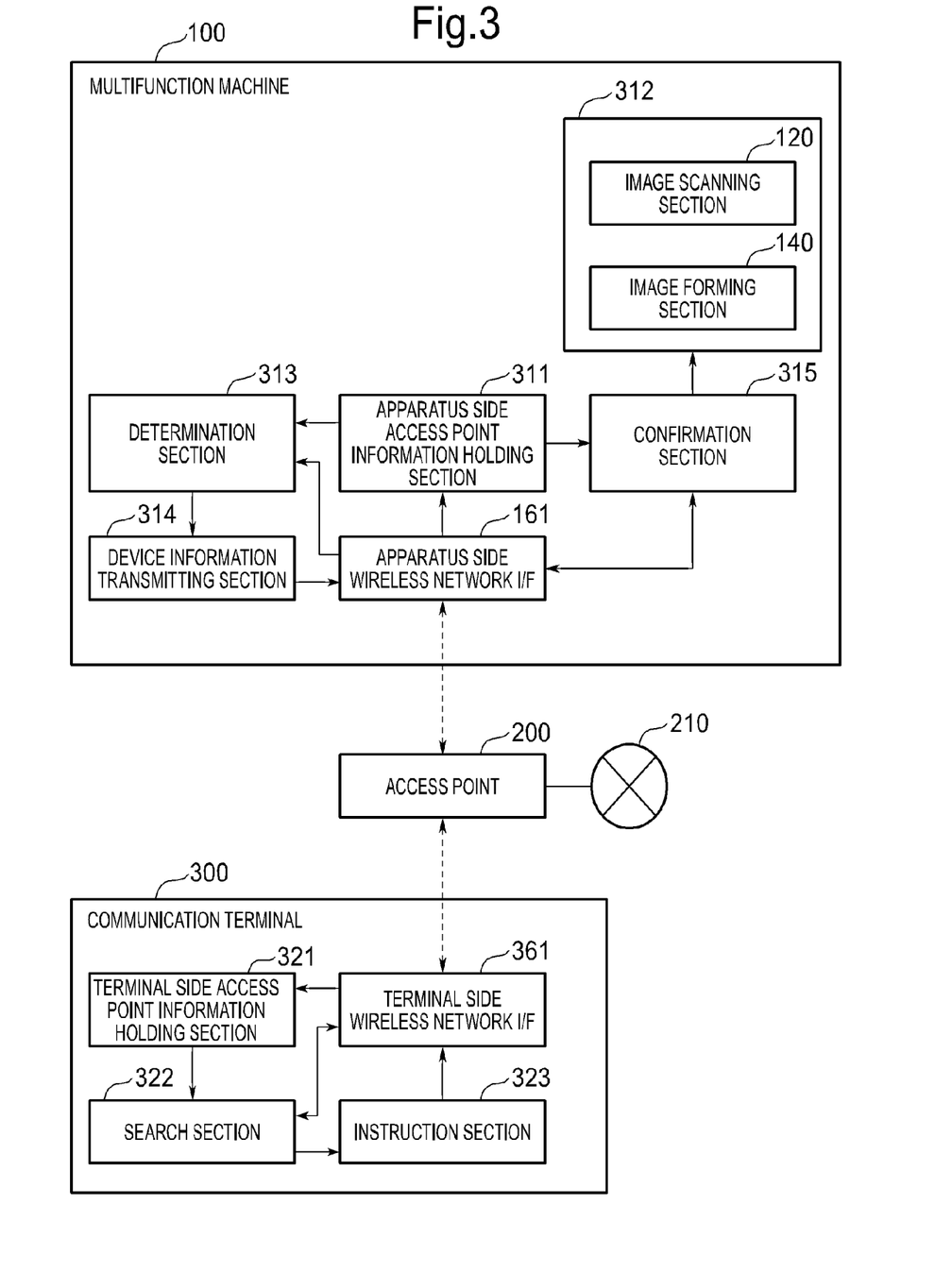
FIG. 3 is a functional block diagram illustrating the image processing system according to the embodiment of the present disclosure.

FIG. 3 illustrates a functional block diagram of the image processing system of the present embodiment. As described above, the image processing system 10 of the present embodiment includes the multifunction peripheral 100 having the apparatus side wireless network interface 161, the communication terminal 300 having the terminal side wireless network interface 361, and the access point 200 connected to the wired network 210.

In the multifunction peripheral 100, the apparatus side wireless network interface 161 establishes a wireless line with the access point 200 to be able to transmit and receive data therebetween. Therefore, the multifunction peripheral 100 can transmit and receive data to and from the apparatus connected to the wired network 210 through the access point 200.

Similarly, in the communication terminal 300, the terminal side wireless network interface 361 establishes a wireless line with the access point 200 to be able to transmit and receive data therebetween. Therefore, the communication terminal 300 can transmit and receive data to and from the apparatus connected to the wired network 210 through the access point 200.

Further, the access point 200 is a so-called wireless base station and the multifunction peripheral 100 including the apparatus side wireless network interface 161 and the communication terminal 300 including the terminal side wireless network interface 361 correspond to a so-called wireless mobile station.

First, the multifunction peripheral 100 will be described. As illustrated in FIG. 3, the multifunction peripheral 100 includes an apparatus side access point information holding section 311 and an image processing section 312. In this configuration, the image processing section 312 includes the image scanning section 120 which scans the document image to generate the image data and the image forming section 140 which prints the image data on paper.

The apparatus side access point information holding section 311 holds the access point information which is acquired from the access point 200 through the apparatus side wireless network interface 161 and uniquely specifies the access point 200. Although not specifically limited, as the access point information, for example, a media access control (MAC (Media Access Control)) address which is uniquely allocated to hardware of a network device can be used.

Further, in the present embodiment, the multifunction peripheral 100 includes a determination section 313 and a device information transmitting section 314. The determination section 313 determines whether the access point information received from the communication terminal 300 through the apparatus side wireless network interface 161 is the same as the access point information held in the apparatus side access point information holding section 311. That is, the determination section 313 determines whether the access point connected to the multifunction peripheral 100 is the same as the access point used by the communication terminal 300.

The device information transmitting section 314 transmits the device information of the multifunction peripheral 100 to the communication terminal 300 through the apparatus side wireless network interface 161 if it is determined that the access point information are the same by the determination section 313. Herein, the device information includes arbitrary information on the multifunction peripheral 100 such as an apparatus name of the multifunction peripheral 100 which is given by the user at the time of installation, a model name of the multifunction peripheral 100, functions (for example, an image scanning function, a facsimile transmitting function, a part or all of the printing function, and the like) which may be carried out in the multifunction peripheral 100, and text information (for example, east side of 3F of office center, 2F of first store at Osaka, or the like). The device information is held in the device information transmitting section 314 which is registered in the multifunction peripheral 100 in advance.

Meanwhile, the communication terminal 300 includes a terminal side access point information holding section 321, a search section 322, and an instruction section 323. Further, the communication terminal 300 includes the CPU, the RAM, the ROM, and the HDD, similar to the multifunction peripheral 100. The CPU executes the programs stored in, for example, the ROM and the HDD by handling the RAM as an operation region to realize each section.

The terminal side access point information holding section 321 holds the access point information (herein, the MAC address) which is acquired from the access point 200 through the terminal side wireless network interface 361 and uniquely specifies the access point 200.

The search section 322 searches for the image processing apparatus having the same access point information as the access point information through the terminal side wireless network interface 361 based on the access point information held in the terminal side access point information holding section 321. For example, the search section 322 searches for the image processing apparatus which can communicate with the communication terminal 300 by broadcast. Although not specifically limited, in the present embodiment, the search section 322 transmits the access point information held in the terminal side access point information holding section 321 through the terminal side wireless network interface 361 at the time of search. Depending on the broadcast, the image processing apparatus having the same access point information as the access point information held in the terminal side access point information holding section 321 answers with the device information included in the image processing apparatus for the communication terminal 300, such that the communication terminal 300 receives the device information through the terminal side wireless network interface 361. The search section 322 detects the image processing apparatus answering with the above-described device information as the image processing apparatus which can communicate with the communication terminal 300.

The instruction section 323 transmits the processing instruction to the image processing apparatus detected by the search section 322 through the terminal side wireless network interface 361. Further, the processing instruction is a data acquisition instruction or a printing execution instruction, and for example, sets the acquisition of the image data and the printing of the image data as the execution processing by the processing instruction. Further, at the time of instructing the printing of the image data, the image data to be printed may be stored in the communication terminal and may be stored in a storage apparatus (for example, file server apparatus) which can be connected through the wired network 210 or may be stored in a virtual server apparatus (for example, cloud server apparatus) which can be connected to the wired network 210. In the latter case, information indicating a storage place of the image data to be printed is included in the processing instruction (in this case, the printing instruction).

Further, according to the present embodiment, the multifunction peripheral 100 includes a confirmation section 315. When the processing instruction is received from the instruction section 323 of the communication terminal 300, the confirmation section 315 acquires the access point information held in the terminal side access point information holding section 321 of the communication terminal 300 through the apparatus side wireless network interface 161 and when the access point information is the same as the access point information held in the apparatus side access point information holding section 311, allows the image processing section 312 to carry out the image processing depending on the processing instruction received from the instruction section 323.

Figure 4:
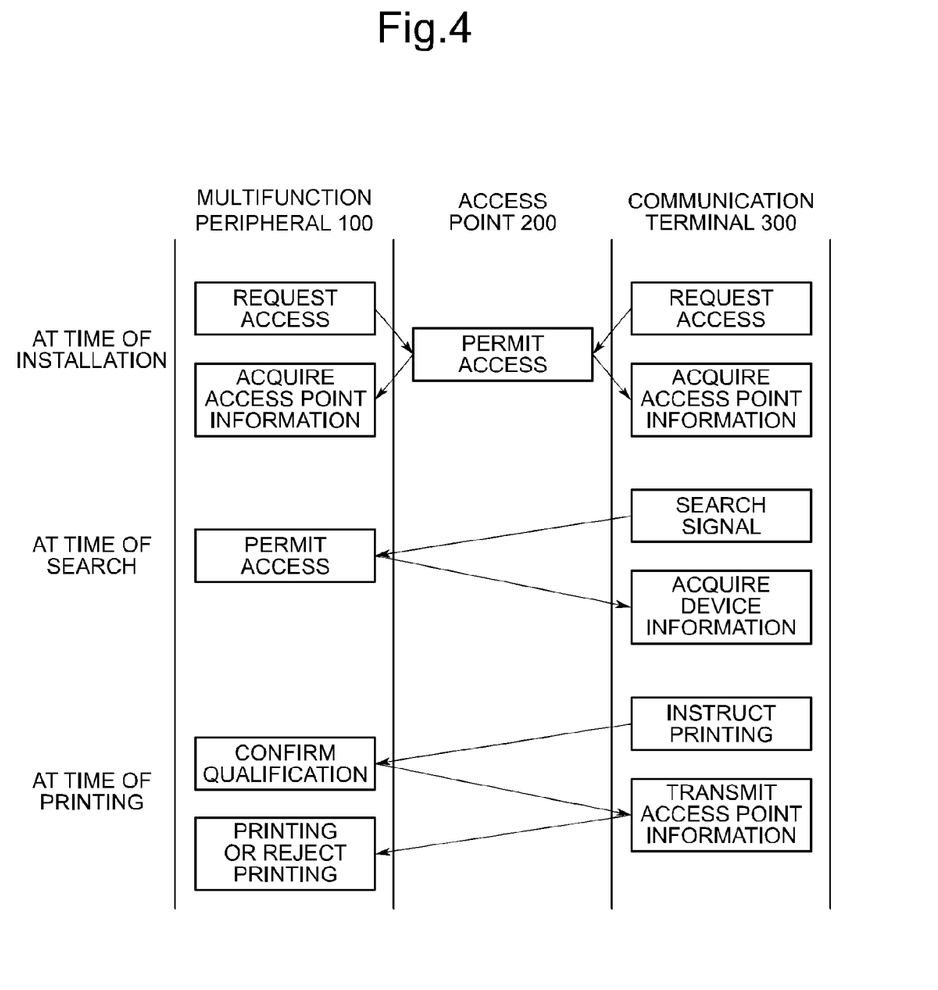
FIG. 4 is a schematic diagram illustrating data transmission and reception in the image processing system according to the embodiment of the present disclosure.

FIG. 4 is a schematic diagram illustrating data transmission and reception among the multifunction peripheral 100, the access point 200, and the communication terminal 300 which configure the image processing system 10. FIG. 4 illustrates the data transmission and reception at the time of installation, search, and printing.

Figure 5:
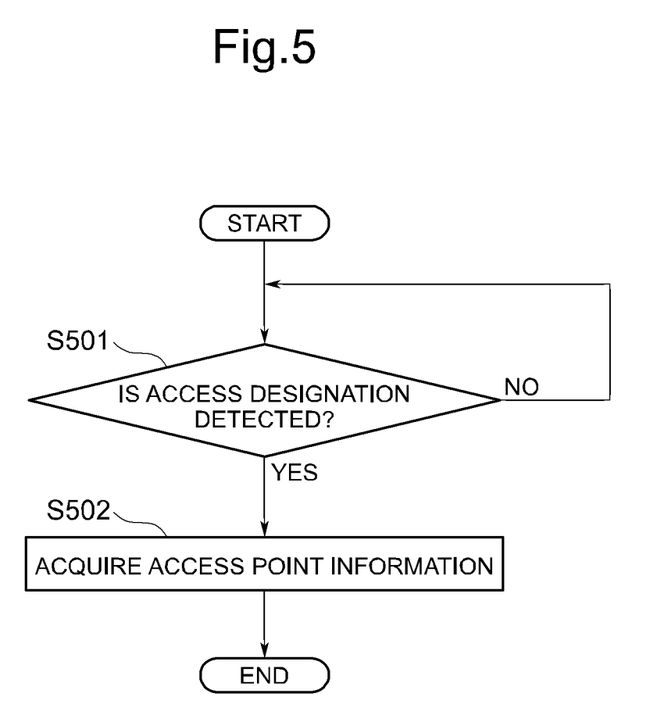
FIG. 5 is a flow chart illustrating an example of an access point information acquiring procedure which is carried out by the image processing system according to the embodiment of the present disclosure.

In FIG. 4, "at the time of installation" represents the data transmission and reception which is carried out when the multifunction peripheral 100 and the communication terminal 300 establish the wireless line with the access point 200. Further, FIG. 5 illustrates an example of the access point information acquisition procedure which is carried out by the multifunction peripheral 100 and the communication terminal 300.

Figure 6:
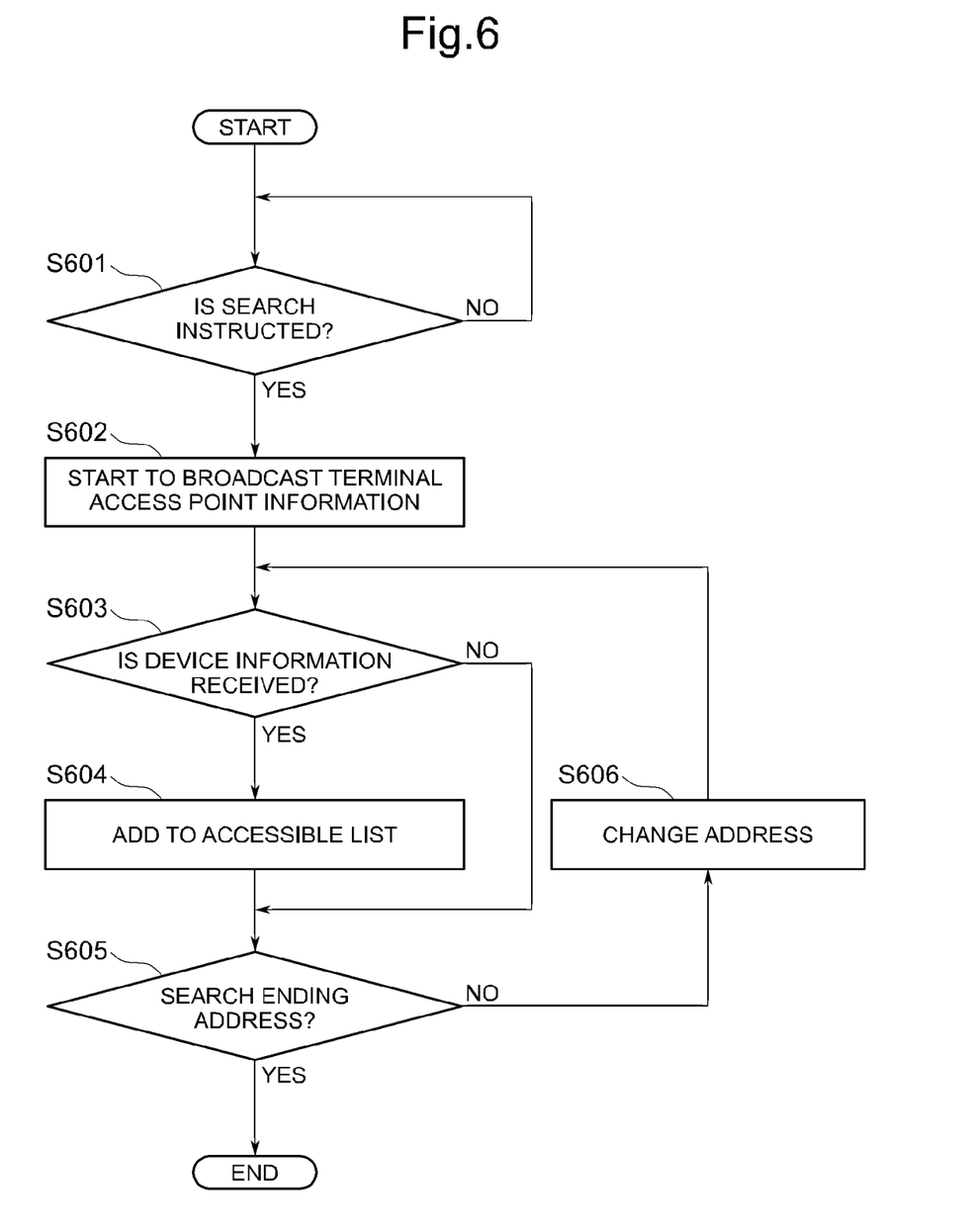
FIG. 6 is a flow chart illustrating an example of a search procedure of the image processing apparatus which is carried out by the image processing system according to the embodiment of the present disclosure.
Figure 7:
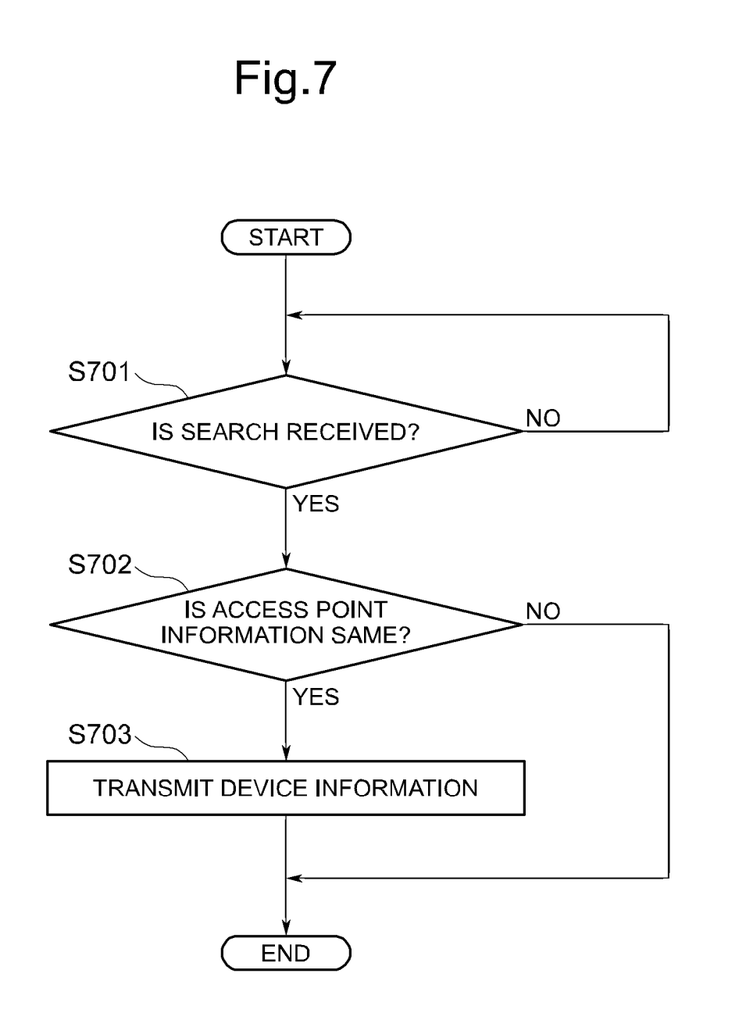
FIG. 7 is a flow chart illustrating an example of a search response procedure which is carried out by the image processing system according to the embodiment of the present disclosure.

In FIG. 4, "at the time of search" represents the data transmission and reception which is carried out when the image processing apparatus (the multifunction peripheral 100) is searched for by the communication terminal 300. Further, FIG. 6 illustrates an example of the image processing apparatus search procedure which is carried out by the communication terminal 300 at the time of the search. FIG. 7 illustrates an example of a search answering procedure which is carried out by the multifunction peripheral 100 at the time of the search.

Figure 8:
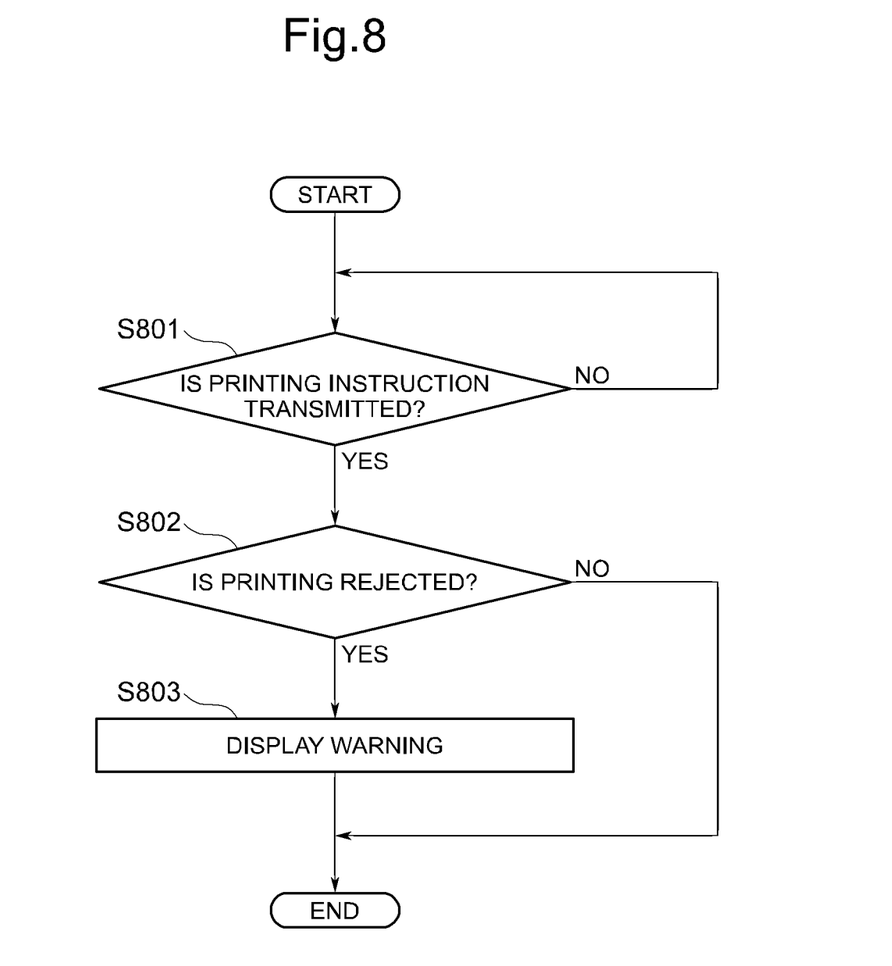
FIG. 8 is a flow chart illustrating an example of a printing instructing procedure which is carried out by the image processing system according to the embodiment of the present disclosure.
Figure 9:
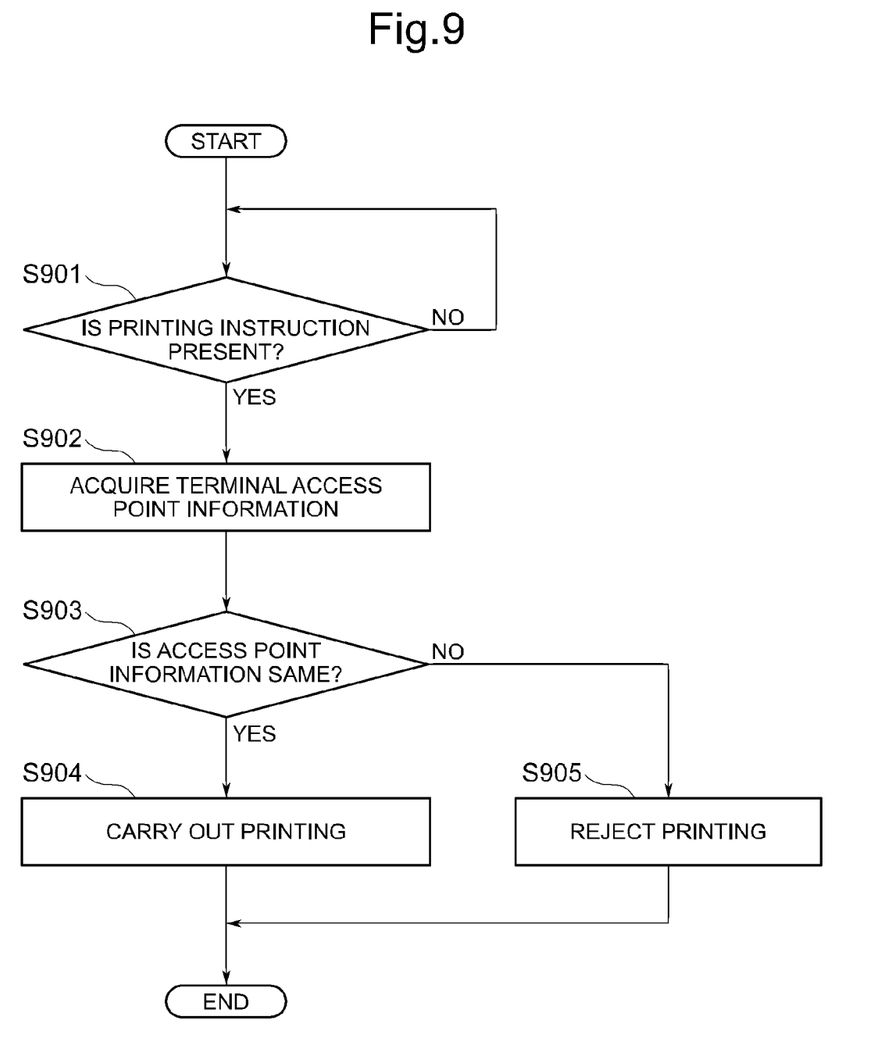
FIG. 9 is a flow chart illustrating an example of a printing execution determining procedure which is carried out by the image processing system according to the embodiment of the present disclosure.

In FIG. 4, "at the time of printing" represents the data transmission and reception which is carried out when the communication terminal 300 instructs the image processing apparatus (the multifunction peripheral 100) detected by the search to perform the printing. FIG. 8 illustrates an example of the printing instruction procedure which is carried out by the communication terminal 300 at the time of the printing. Further, FIG. 9 illustrates an example of a printing execution determining procedure carried out by the multifunction peripheral 100 at the time of the printing.

Further, the procedure illustrated in FIGS. 5 to 9 starts by setting the case in which power is applied to the multifunction peripheral 100 and the communication terminal 300 and the case in which each procedure is completed as a trigger. That is, each procedure starts at all times in the multifunction peripheral 100 and the communication terminal 300 during the application of power.

First, "at the time of installation" will be described. The multifunction peripheral 100 (the apparatus side wireless network interface 161) detects the access point to be connected to the network 210 at the installed position (No in step S501 of FIG. 5). In this regard, when the installation position is in the communicable range of the access point 200, the multifunction peripheral 100 detects the access point 200 (Yes in step S501 of FIG. 5).

When the multifunction peripheral 100 installed in the communicable range of the access point 200 wants to establish the wireless line with the access point 200, as illustrated in FIG. 4, the multifunction peripheral 100 (the apparatus side wireless network interface 161) transmits an access request to the access point 200. The access point 200 transmits information required to establish the wireless line, including the access point information (herein, the MAC address) uniquely specifying the access point 200 to the multifunction peripheral 100, depending on the access request. By doing so, the multifunction peripheral 100 acquires the access point information of the access point 200 (step S502 of FIG. 5). Cope with this, the acquired access point information of the access point 200 is held in the apparatus side access point information holding section 311.

Similarly, when the communication terminal 300 (the terminal side wireless network interface 361) wants to be connected to the network 210, the communication terminal 300 searches the access point in situ (step S501 of FIG. 5). In this regard, when the communication terminal 300 is in the communicable range of the access point 200, the communication terminal 300 detects the access point 200 (Yes in step S501 of FIG. 5).

The communication terminal 300 (the terminal side wireless network interface 361) located within the communicable range of the access point 200 transmits the access request to the access point 200 as illustrated in FIG. 4. The access point 200 transmits information required to establish the wireless line, including the access point information (herein, the MAC address) uniquely specifying the access point 200 to the communication terminal 300, depending on the access request. Cope with this, the communication terminal 300 acquires the access point information of the access point 200 (step S502 of FIG. 5). Cope with this, the acquired access point information of the access point 200 is held in the terminal side access point information holding section 321.

Next "at the time of search" will be described. When a user having the communication terminal 300 wants to print, for example, the image data and thus searches for the image processing apparatus carrying out the printing, the user searches for the image processing apparatus using the search section 322 of the communication terminal 300 (step S601 of FIG. 6). In this regard, the search section 322 transmits a search signal including the access point information (herein, the MAC address of the access point 200) held in the terminal side access point information holding section 321 in a broadcast manner as illustrated in FIG. 4 (step S602 of FIG. 6). In this regard, the search section 322 transmits the search signal including the access point information (herein, the MAC address of the access point 200) to all the IP addresses in a predetermined range and confirms whether an answer to the search signal is present.

As illustrated in FIG. 4, when the answer from the image processing apparatus (the multifunction peripheral 100) for the search signal is present, the search section 322 acquires the device information included in the answer (Yes in step S603 of FIG. 6). The search section 322 records the acquired device information in an accessible list which is held in the section 322 (step S604 of FIG. 6). Further, when the access point information is not transmitted to a final image processing apparatus, which becomes a transmission object, by the broadcast transmission, that is, when a transmission designation address of the access point information does not reach a search ending address which is an address for the final image processing apparatus, the search signal for a next address which is an address of the image processing apparatus to be subsequently transmitted is transmitted (No in step S605, S606 and S603 of FIG. 6).

Meanwhile, even when the answer for the search signal from the image processing apparatus is not present, the search section 322 transmits the search signal to the next address when not reaching the search ending address (No in step S603, No in S605, S606 and S603 of FIG. 6).

Further, when reaching the search ending address, the search section 322 ends the search. Further, at the time of the search, when the device information is received, the device information is recorded in the above-described accessible list.

Herein, the operation of the multifunction peripheral 100 receiving the search signal will be described. As illustrated in FIG. 7, if the multifunction peripheral 100 receives the search signal through the apparatus side wireless network interface 161 as the image processing apparatus (step S701 of FIG. 7), the determination section 313 determines whether the terminal side access point information included in the search signal is the same as the access point information held in the apparatus side access point information holding section 311 (step S702 of FIG. 7).

When the access point information coincides, the determination section 313 informs the device information transmitting section 314 to that effect. The informed device information transmitting section 314 transmits the above-described device information to the communication terminal 300 through the apparatus side wireless network interface 161 (Yes in step S702, and S703 of FIG. 7). Meanwhile, when the access point information does not coincide, the determination section 313 ends the above flow (No in step S702 of FIG. 7) without doing anything.

As such, in the image processing system 10, when the access point information held in the communication terminal 300 coincides with the access point information held in the multifunction peripheral 100, that is, when the communication terminal 300 and the multifunction peripheral 100 use the same access point, the communication terminal 300 is informed of the device information of the multifunction peripheral 100. That is, when the communication terminal 300 and the multifunction peripheral 100 use the same access point, the communication terminal 300 can recognize the multifunction peripheral 100.

Next, "at the time of printing" will be described. As described above, when the user holding the communication terminal 300 wants to print, for example, the image data and thus detects the image processing apparatus by the above-described search, the device information of the accessible image processing apparatus is recorded in the accessible list of the search section 322. The user selects the desired image processing apparatus (herein, the multifunction peripheral 100 having the printing function) from the accessible list to transmit the printing instruction. In this regard, the instruction section 323 transmits the printing instruction including the location of the image data which becomes the printing object or the image data which becomes the printing object to the multifunction peripheral 100 (Yes in step S801 of FIG. 8).

As illustrated in FIG. 4, the printing instruction reaches the multifunction peripheral 100. Herein, the operation of the multifunction peripheral 100 receiving the printing instruction will be described. As illustrated in FIGS. 4 and 9, if the multifunction peripheral 100 receives the printing instruction through the apparatus side wireless network interface 161 (Yes in step S901 of FIG. 9), the confirmation section 315 requests the communication terminal 300 to transmit the access point information held in the terminal side access point information holding section 321 and acquires the access point information from the communication terminal 300 (step S902 of FIG. 9).

The confirmation section 315 acquiring the access point information held in the communication terminal 300 transmitted depending on the request determines whether the acquired terminal side access point information is the same as the access point information held in the apparatus side access point information holding section 311 (step S903 of FIG. 9).

When the access point information coincides, the confirmation section 315 allows the image forming section 140 to carry out the printing depending on the received printing instruction (Yes in step S903, and S904 of FIG. 9). Meanwhile, when the access point information does not coincide, the confirmation section 315 informs the communication terminal 300 that the printing is rejected (No in step S903, and S905 of FIG. 9).

Figure 10:
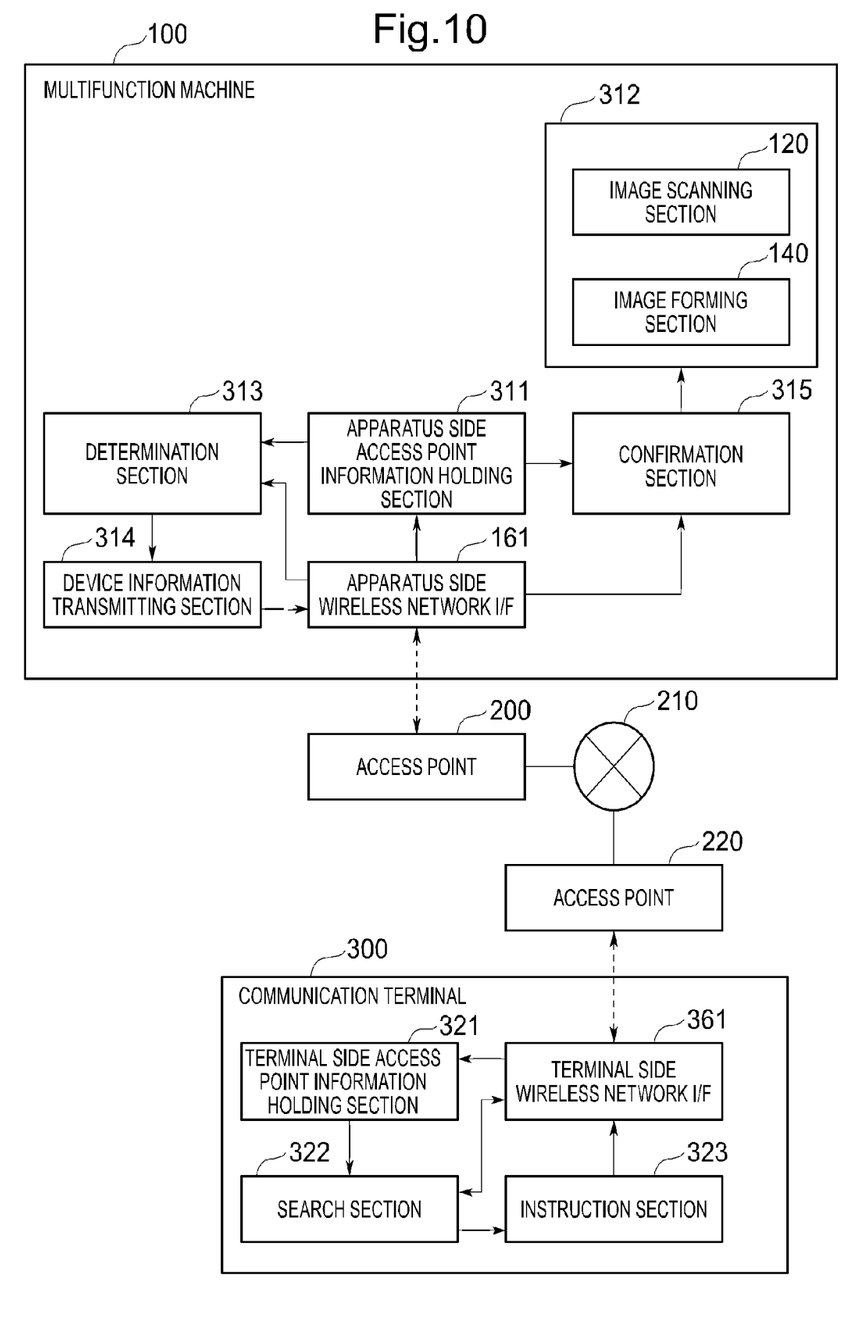
FIG. 10 is a functional block diagram illustrating the image processing system according to the embodiment of the present disclosure.

As the condition under which the printing rejection occurs, there may be, for example, the case in which, when the communication terminal 300 continues to move, at the time of the search, as illustrated in FIG. 3, the wireless line to the access point 200 is established, but at the time of the printing, as illustrated in FIG. 10, the wireless line is established with another access point 220 different from the access point 200.

Further, the communication terminal 300 transmitting the printing instruction is informed of the printing rejection, the user (Yes in step S802, and S803 of FIG. 8) is informed of the printing rejection through a message to that effect displayed on the display included in the communication terminal 300, and the like. In addition, when the printing is carried out according to the processing instruction, the procedure ends as it is (No in step S802 of FIG. 8). Further, even when the printing is carried out, like the printing rejection, the user is informed of the printing execution through a displayed message, and the like.

As such, in the image processing system 10, when the access point information held in the communication terminal 300 coincides with the access point information held in the multifunction peripheral 100, that is, when the communication terminal 300 and the multifunction peripheral 100 use the same access point, the communication terminal 300 can carry out the printing in the multifunction peripheral 100.

Further, the case in which the image processing involves printing is described above, but in addition to printing, the image processing may be image processing such as acquisition of image data using a scanner function. Further, an example in which the communication terminal 300 is a portable PC is described above, but the communication terminal 300 may communicate with the access point and include any communication terminal such as a note type personal computer, a tablet type personal computer, a portable terminal such as a smart phone, and the like.

As described above, the image processing system 10 may carry out the printing when the communication terminal 300 and the multifunction peripheral 100 use the same access point 200. That is, the image processing system 10 may carry out the printing by the multifunction peripheral 100 present in the vicinity of the communication terminal 300, using the fact that a distance range in which the wireless mobile station communicably accesses the access point is limited. In this configuration, since the server apparatus is not required to figure out a distance between the multifunction peripheral 100 and the communication terminal 300, the system can be built at a very low price.

Further, since the image processing system 10 is configured to acquire the device information, the image processing system 10 can acquire information on whether the detected image processing apparatus has the desired functions or information on where the approximate installation position of image processing apparatus is, and the like, at the time of searching for the image processing apparatus. In this configuration, when the image processing system is applied to, for example, a public wireless LAN, it is possible to acquire information on a shop, and the like, in which the image processing apparatus having the desired functions is installed.

Further, in the image processing system 10, for example, when the communication terminal 300 moves to use different access points, and the like, the image processing is not carried out under the condition that the communication terminal 300 is away from the image processing apparatus detected at the time of the search. Therefore, for example, since there is no possibility to carry out the printing under the condition that the printed matter cannot be withdrawn immediately, it is possible to relieve the risk in safety of a third party leaving with the printed matter.

Compared with this, for example, the related art requires the server managing the zone data or the positioning server and needs to register the position information of each wireless base station (the access point) or the position information of the image processing apparatus in the server in advance. In this configuration, when the access point or the installation position of the image processing apparatus is changed, the desired effect cannot be obtained when the pre-registered information in the server is not updated.

Further, in this configuration, when the pre-registered information is manually updated, the operation cost is expensive and when the pre-registered information is automatically updated, the system itself is expensive, such that the introduction cost of the image processing system increases. In addition, there is a need to install the server apparatus for managing the position information. For this reason, when the image processing system is applied to the public wireless LAN which has been rapidly proliferated recently, there is a need to adopt the high-reliability, expensive server apparatus and implement the system dualization so as to secure the reliability of the system, which incurs much cost.

Further, the above-described embodiments are not limited to the technical range of the contents illustrated in the present disclosure, but in addition to the above description, various changes or applications can be made within the range of the present disclosure. For example, in particular, the configuration including the confirmation section 315 as the preferred form is described, but the configuration is an optional component. Even in the configuration which does not include the component, the nearest image processing apparatus can be detected by a simple configuration in which the server apparatus for managing the position information is not installed and at low cost and when the communication terminal does not move, the nearest image processing apparatus can carry out the image processing. Similarly, in the viewpoint that the nearest image processing apparatus can be detected by a simple configuration in which the server apparatus for managing the position information is not installed and at low cost, the device information transmitting section 314 is not an essential component either in the form described in the present disclosure. Further, in this case, the function of recognizing that the access point information is the same may be included in the communication terminal.

Further, the order of each step of the flow chart illustrated in FIGS. 5 to 9 may be appropriately changed within the range in which the equivalent actions are obtained. In addition, in the above-described embodiments, the present disclosure is described in detail with reference to the digital multifunction peripheral, but is not limited thereto, and therefore the contents described in the present disclosure can be applied to any image processing apparatus, such as a scanner, a printer, a copier, and the like.

According to the present disclosure, the nearest image processing apparatus can carry out the image processing by the simple configuration in which the server apparatus for managing the position information is not installed and at low cost, and the image processing system, the image processing method, and the image processing apparatus can be useful.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image processing system, comprising:
an access point which establishes communication with a wireless station through a wireless line;
an image processing apparatus connected to the access point through the wireless line; and
a communication terminal connected to the access point through the wireless line,
wherein the image processing apparatus comprises:
an apparatus side wireless network interface configured to transmit and receive data to and from the access point;
an apparatus side access point information holding section configured to hold access point information which is acquired from the access point through the apparatus side wireless network interface and uniquely specifies the access point; and
an image processing section configured to process image data, and
the communication terminal comprises:
a terminal side wireless network interface configured to transmit and receive data to and from the access point;
a terminal side access point information holding section configured to hold access point information which is acquired from the access point through the terminal side wireless network interface and uniquely specifies the access point;
a search section configured to search for the image processing apparatus having the same access point information as the access point information through the terminal side wireless network interface based on the access point information held in the terminal side access point information holding section; and
an instruction section configured to transmit a processing instruction to the image processing apparatus detected by the search section through the terminal side wireless network interface,
wherein the search section of the communication terminal transmits the access point information held in the terminal side access point information holding section through the terminal side wireless network interface, and the image processing apparatus further comprises:
a determination section configured to determine whether the access point information received from the communication terminal through the apparatus side wireless network interface is the same as the access point information held in the apparatus side access point information holding section; and
a device information transmitting section configured to transmit the device information of the image processing apparatus to the communication terminal through the apparatus side wireless network interface when the determination section determines that the access point information received from the communication terminal through the apparatus side wireless network interface is the same as the access point information held in the apparatus side access point information holding section.

2. The image processing system of claim 1, wherein the communication terminal receives the device information from the image processing apparatus through the terminal side wireless network interface, and the search section detects the image processing apparatus which returned the device information to the communication terminal as the image processing apparatus communicable with the communication terminal.

3. An image processing system, comprising:
an access point which establishes communication with a wireless station through a wireless line;
an image processing apparatus connected to the access point through the wireless line; and
a communication terminal connected to the access point through the wireless line,
wherein the image processing apparatus comprises:
an apparatus side wireless network interface configured to transmit and receive data to and from the access point;
an apparatus side access point information holding section configured to hold access point information which is acquired from the access point through the apparatus side wireless network interface and uniquely specifies the access point; and
an image processing section configured to process image data, and
the communication terminal comprises:
a terminal side wireless network interface configured to transmit and receive data to and from the access point;
a terminal side access point information holding section configured to hold access point information which is acquired from the access point through the terminal side wireless network interface and uniquely specifies the access point;
a search section configured to search for the image processing apparatus having the same access point information as the access point information through the terminal side wireless network interface based on the access point information held in the terminal side access point information holding section; and
an instruction section configured to transmit a processing instruction to the image processing apparatus detected by the search section through the terminal side wireless network interface,
wherein the image processing apparatus further comprises a confirmation section configured to acquire the access point information held in the terminal side access point information holding section of the communication terminal through the apparatus side wireless network interface when the processing instruction is received from the communication terminal and allow the image processing section to carry out the image processing depending on the received processing instruction when the access point information acquired is the same as the access point information held in the apparatus side access point information holding section.

4. An image processing method executed by an image processing system including an access point which establishes communication with a wireless station through a wireless line, an image processing apparatus connected to the access point through the wireless line, and a communication terminal connected to the access point through the wireless line, the image processing method comprising:
- acquiring access point information by allowing the image processing apparatus to uniquely specify the access point through an apparatus side wireless network interface which transmits and receives data to and from the access point;
- acquiring access point information by allowing the communication terminal to uniquely specify the access point through a terminal side wireless network interface which transmits and receives data to and from the access point;
- searching, by the communication terminal, for the image processing apparatus having the same access point information as the access point information acquired from the access point through the terminal side wireless network interface;
- transmitting, by the communication terminal, a processing instruction to the image processing apparatus having the detected same access point information through the terminal side wireless network interface;
- processing, by the image processing apparatus, image data depending on the received processing instruction;
- transmitting, by the communication terminal, the access point information acquired by the communication terminal to the image processing apparatus through the terminal side wireless network interface;
- determining, by the image processing apparatus, whether the access point information received from the communication terminal through the apparatus side wireless network interface is the same as the access point information acquired by the image processing apparatus; and
- transmitting, by the image processing apparatus, a device information of the image processing apparatus to the communication terminal through the apparatus side wireless network interface when the result of the transmitting indicates the both access point information are the same.

5. The image processing method of claim 4, wherein the communication terminal receives the device information from the image processing apparatus through the terminal side wireless network interface, and under the searching the communication terminal detects the image processing apparatus which returned the device information to the communication terminal as the image processing apparatus communicable with the communication terminal at the searching.

6. An image processing apparatus to be used in an image processing system including an access point which establishes communication with a wireless station through a wireless line, the image processing apparatus connected to the access point through the wireless line, and a communication terminal connected to the access point through the wireless line, the image processing apparatus comprising:
- an apparatus side wireless network interface configured to transmit and receive data to and from the access point;
- an apparatus side access point information holding section configured to hold access point information which is acquired from the access point through the apparatus side wireless network interface and uniquely specifies the access point; and
- an image processing section configured to process image data,
- wherein when access point information uniquely specifying the access point acquired by the communication terminal from the access point through a terminal side wireless network interface which transmits and receives the data to and from the access point is the same as access point information held in the apparatus side access point information holding section, a processing instruction transmitted from the communication terminal through the terminal side wireless network interface is received through the access point and the apparatus side wireless network interface and processing depending on the processing instruction is carried out by the image processing section,
- wherein the image processing apparatus further comprises a confirmation section configured to acquire the access point information held in the terminal side access point information holding section of the communication terminal through the apparatus side wireless network interface when the processing instruction is received from the communication terminal and allow the image processing section to carry out the image processing depending on the received processing instruction when the access point information acquired is the same as the access point information held in the apparatus side access point information holding section.

7. An image processing method executed by an image processing system including an access point which establishes communication with a wireless station through a wireless line, an image processing apparatus connected to the access point through the wireless line, and a communication terminal connected to the access point through the wireless line, the image processing method comprising:
- acquiring access point information by allowing the image processing apparatus to uniquely specify the access point through an apparatus side wireless network interface which transmits and receives data to and from the access point;
- acquiring access point information by allowing the communication terminal to uniquely specify the access point through a terminal side wireless network interface which transmits and receives data to and from the access point;
- searching, by the communication terminal, for the image processing apparatus having the same access point information as the access point information acquired from the access point through the terminal side wireless network interface;
- transmitting, by the communication terminal, a processing instruction to the image processing apparatus having the detected same access point information through the terminal side wireless network interface; and
- acquiring, by the image processing apparatus, the access point information acquired by the communication terminal through the apparatus side wireless network interface when the processing instruction from the communication terminal is received, and the image processing apparatus carries out the image processing depending on the received processing instruction when the access point information received from the communication terminal is the same as the access point information acquired by the image processing apparatus.

* * * * *